United States Patent
Gautam

(10) Patent No.: US 12,490,133 B2
(45) Date of Patent: Dec. 2, 2025

(54) SYSTEM AND METHOD FOR MDAS ASSISTED GST CONFIGURATION

(71) Applicant: Samsung Electronics Co., Ltd., Suwon-si (KR)

(72) Inventor: Deepanshu Gautam, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 318 days.

(21) Appl. No.: 18/014,579

(22) PCT Filed: Jul. 6, 2021

(86) PCT No.: PCT/KR2021/008610
§ 371 (c)(1),
(2) Date: Jan. 5, 2023

(87) PCT Pub. No.: WO2022/010242
PCT Pub. Date: Jan. 13, 2022

(65) Prior Publication Data
US 2023/0262502 A1 Aug. 17, 2023

(30) Foreign Application Priority Data

Jul. 6, 2020 (IN) .............................. 202041028701
Jul. 2, 2021 (IN) ............................. 2020 41028701

(51) Int. Cl.
*H04W 24/10* (2009.01)
*H04L 41/14* (2022.01)
(Continued)

(52) U.S. Cl.
CPC ........... *H04W 24/10* (2013.01); *H04L 41/145* (2013.01); *H04L 43/062* (2013.01); *H04W 24/08* (2013.01)

(58) Field of Classification Search
None
See application file for complete search history.

(56) References Cited

U.S. PATENT DOCUMENTS

2019/0394655 A1* 12/2019 Rahman ................ H04L 41/142
2020/0044943 A1   2/2020 Bor-Yaliniz et al.
(Continued)

FOREIGN PATENT DOCUMENTS

| WO | 2019/032968 A1 | 2/2019 |
| WO | 2020/025009 A1 | 2/2020 |
| WO | 2020/033424 A1 | 2/2020 |

OTHER PUBLICATIONS

3GPP; 3rd Generation Partnership Project; Technical Specification Group Services and System Aspects; Management and orchestration; Study on enhancement of Management Data Analytics (MDA) (Release 17); 3GPP TR 28.809; V0.4.0; Jun. 17, 2020; Valbonne, France.

(Continued)

*Primary Examiner* — Adolf Dsouza
(74) *Attorney, Agent, or Firm* — Jefferson IP Law, LLP

(57) ABSTRACT

A method for generating a Slice Traffic Analytics Report (STAR) is provided. The method includes receiving a first request for subscribing to Slice Traffic Analytics Report (STAR) from a Network Slice Subnet Management Function (NSSMF), collecting one or more performance measurements from each of the one or more network functions after completion of a pre-defined time period, and generating the STAR based on the one or more performance measurements collected from the one or more network functions using an Artificial Intelligence (AI) based model.

11 Claims, 6 Drawing Sheets

| Data Category | Required Data |
|---|---|
| Performace Meassurement / KPIs | From each UPF instance in the slice: Current Uplink throughput, Current Downlink throughput, Current Maximum packet size |
| | From each gNB instance in the slice: Current Uplink UE throughput and Current Downlink UE throughput |
| | From each SMF instance in the slice: Current Number of PDU session |
| | From each AMF instance in the slice: Current Number of registered subscriptions |
| | |

(51) Int. Cl.
*H04L 43/062* (2022.01)
*H04W 24/08* (2009.01)

(56) References Cited

U.S. PATENT DOCUMENTS

| | | |
|---|---|---|
| 2020/0252813 A1 | 8/2020 | Li et al. |
| 2021/0021494 A1* | 1/2021 | Yao .................. H04L 43/04 |
| 2021/0037400 A1* | 2/2021 | Yao .................. H04W 24/04 |
| 2021/0160147 A1 | 5/2021 | Chou et al. |
| 2021/0258866 A1* | 8/2021 | Chou ................ H04W 48/16 |

OTHER PUBLICATIONS

Samsung; MDAS assisted network slice traffic projections; 3GPP TSG-SA5 Meeting #132e; S5-204581; Aug. 17-28, 2020; Online.
International Search Report dated Oct. 21, 2021; International Appln. No. PCT/KR2021/008610.

* cited by examiner

FIG. 5

| Data Category | Required Data |
|---|---|
| Performace Meassurement / KPIs | From each UPF instance in the slice: Current Uplink throughput, Current Downlink throughput, Current Maximum packet size |
| | From each gNB instance in the slice: Current Uplink UE throughput and Current Downlink UE throughput |
| | From each SMF instance in the slice: Current Number of PDU session |
| | From each AMF instance in the slice: Current Number of registered subscriptions |

FIG. 6

| Attribute Name | | Description |
|---|---|---|
| Slice Traffic Analytics Report (STAR) (305) | Slice Identifier | Identifired of the slice for which the report is provided |
| | Projection Timestamp | provided a particular time stamp for which the projections are provided |
| | Projection Duration | provided a time duration during which the average projections are provided |
| | For each UPF in the slice Projections | Projected Uplink throughput |
| | | Projected Downlink throughput |
| | | Projected Maximum packet size |
| | For each gNB in the slice | Projected Uplink UE throughput |
| | | Projected Downlink UE throughput |
| | For each SMF in the slice | Projected Number of PDU session |
| | For each AMF in the slice | Projected Number of subscriptions registered |

SYSTEM AND METHOD FOR MDAS ASSISTED GST CONFIGURATION

TECHNICAL FIELD

The present disclosure relates to a field of Fifth Generation (5G) network, in particular relates to a system and method for Management Data Analytics Service (MDAS) assisted Generic Slice Template (GST) configuration in a Fifth Generation (5G) network.

BACKGROUND ART

In general, Network slicing is the key feature of the 5G networks that enables to build dedicated logical networks on a shared infrastructure. These dedicated networks would permit the implementation of tailor-made functionality and network operation specific to the needs of each slice customer, rather than a one-size-fits-all approach as witnessed in the existing and previous mobile generations, which would not be economically viable. Further, Global System for Mobile Communications Association (GSMA) has worked on GSMA Generic Slice Template (GST) to provide a standardized list of attributes that can characterize a type of network slice.

Third Generation Partnership Project (3GPP) SA5 specifications (TS 28.541) have adopted the concept of GST and have discussed the mechanism to use GST in Slice Management. The GSMA GST is used as the SLS (Service Level Specification) information for the communication between the vertical industry and the communication service provider. The SLS requirements can be fulfilled from management aspect and control aspect in a coordinated way. The SLS includes Service Profile information model.

Further, a Management Data Analytics Service (MDAS) provides data analytics of various network related parameters including, for example, load level and/or resource utilization and the like associated with a Network Function (NF). For example, the MDAS collects the NF's load related performance data, for example, a resource usage status of the NF and the like. The collected data is analyzed to forecast the resource usage information for a subsequent time instants. Further, the collected data is analyzed to recommend appropriate actions for example, scaling of resources, admission control, load balancing of traffic, and the like.

DISCLOSURE OF INVENTION

Technical Problem

The 3GPP has adopted GST values into the ServiceProfile. Some of the requirements captured in the ServiceProfile are translated into configurable parameter for various network entities including entities in 5G Core Network (5GC), Radio Access Network (RAN) and Transport Network. Therefore, there is a need for the requirements in the GST to be divided among all the targeted NF instance based on the traffic analytics. The value for a particular configurable parameter (translated from a particular ServiceProfile attribute) for a particular NF is crucial, especially if multiple instance of that NFs is available in the network slice instance. One the example would be: the GST attribute Downlink throughput per slice (dLThptPerSlice) can be translated into maximum downlink throughput per slice (maxDlThptPerSlice) as a configuration parameter, for UPF. As one slice may have multiple User Plane Function (UPF), dividing the total quota available among each UPF instance is critical.

Thus, it is desired to address the above mentioned disadvantages or other shortcomings or at least provide a useful alternative.

Solution to Problem

Accordingly, embodiments herein disclose a method for generating a Slice Traffic Analytics Report (STAR) in a network. The method comprises receiving a first request for subscribing to a Slice Traffic Analytics Report (STAR) from a Network Slice Subnet Management Function (NSSMF). Further, collecting one or more performance measurements from each of the one or more network functions after completion of a pre-defined time period. Furthermore, generating the STAR based on the one or more performance measurements collected from the one or more network functions using an Artificial Intelligence (AI) based model.

In an embodiment, the method comprises, receiving a second request from the NSSMF for the generated STAR. Further, sending a response comprising the STAR to the NSSMF upon receiving the second request, wherein the NSSMF configures one or more configurable attributes in proportion to the traffic projection received in the response.

In an embodiment, the first request results in sending a createMeasurementJob request to a MnS Producer, wherein the createMeasurementJob request comprises at least one of a collection period, one or more performance measurements to be collected, a list of network functions based on a location and an available virtual resource.

In an embodiment, the createMeasurementJob request comprises a reporting method as one of a data file, and a data streaming.

In an embodiment, the one or more performance measurements comprises at least one of a current uplink throughput per slice, current downlink throughput per slice, current maximum packet size for a slice, current uplink User Equipment (UE) throughput in a slice, current downlink UE throughput in a slice, current number of Protocol Data Unit (PDU) session per slice, and current number of registered subscriptions per slice.

In an embodiment, the one or more network functions comprises at least one of one or more User Plane Functions (UPFs), one or more Session Management Functions (SMFs), one or more Access and Mobility Management Functions (AMFs), and one or more Next Generation NodeBs (gNBs).

In an embodiment, collecting one or more performance measurements comprises receiving from one or more network functions one or more current values for the one or more performance measurements via a MnS Producer.

In an embodiment, generating the STAR comprises providing one or more current values of one or more performance measurements as an input to the AI based model, wherein the AI based model includes a time-series forecasting technique. Further, obtaining an output from the AI based model, wherein the output indicates one or more projected values for each of the one or more performance measurements as analytics attributes of the STAR.

In an embodiment, the STAR comprises at least one of a slice subnet identifier, a projection timestamp, a projection duration, and one or more projected values for the one or more analytics attributes for each network function.

In an embodiment, receiving the one or more current values for the one or more performance measurements via a MnS Producer when a reporting method is via a data file comprises receiving a notifyfileReady notification from the MnS Producer when the data file comprising a required performance measurements is ready as defined in TS 28.550 and TS 28.532.

In an embodiment, receiving the one or more current values for the one or more performance measurements via a MnS Producer when a reporting method is via data streaming comprises establishing a stream connection using establishStreamingConnection operation as defined in TS 28.550 and TS 28.532. Further, receiving a required measurement stream data from the Mns Producer using reportStreamData operation as defined in TS 28.550.

In an embodiment, the method comprises sending, by the NSSMF, a network function configuration request via modifyMOIAttributes operation as defined in generic Provisioning management service (in TS 28.532) to configure the one or more network functions with corresponding configuration parameter associated with one or more configurable attributes.

Accordingly, the embodiments herein provide a Management Data Analytics Service (MDAS) producer for generating a Slice Traffic Analytics Report (STAR) in a network. The MDAS producer comprises a memory, a processor, and an attribute controller communicatively coupled to the memory and the processor. The attribute controller is configured to receive a first request for subscribing to a Slice Traffic Analytics Report (STAR) from a Network Slice Subnet Management Function (NSSMF). Further, the attribute controller is configured to collect one or more performance measurements from each of the one or more network functions after completion of a pre-defined time period. Furthermore, the attribute controller is configured to generate the STAR based on the one or more performance measurements collected from the one or more network functions using an Artificial Intelligence (AI) based model.

In an embodiment, the attribute controller is configured to receive a second request from the NSSMF for the generated STAR. Further, the attribute controller is configured to send a response comprising the STAR to the NSSMF upon receiving the second request, wherein the NSSMF configures one or more configurable attributes in proportion to the traffic projection received in the response.

In an embodiment, the first request results in sending a createMeasurementJob request to a MnS Producer, wherein the createMeasurementJob request comprises at least one of a collection period, one or more performance measurements to be collected, a list of network functions based on a location of the network functions, and an available virtual resource.

In an embodiment, the createMeasurementJob request comprises a reporting method as one of a data file, and a data streaming.

In an embodiment, the one or more performance measurements comprises at least one of a current uplink throughput per slice, current downlink throughput per slice, current maximum packet size for a slice, current uplink User Equipment (UE) throughput in a slice, current downlink UE throughput in a slice, current number of Protocol Data Unit (PDU) session per slice, and current number of registered subscriptions per slice.

In an embodiment, the attribute controller is configured to collect one or more performance measurements comprises receiving from one or more network functions a one or more current values for the one or more performance measurements via a MnS Producer.

In an embodiment, the attribute controller is configured to generate the STAR comprises providing one or more current values of one or more performance measurements as an input to the AI based model, wherein the AI based model includes a time-series forecasting technique. Further, obtaining an output from the AI based model, wherein the output indicates one or more projected values for each of the one or more performance measurements as analytics attributes of the STAR.

In an embodiment, the STAR comprises at least one of a slice subnet identifier, a projection timestamp, a projection duration, and one or more projected values for the one or more analytics attributes for each network function.

In an embodiment, the attribute controller is configured to receive the one or more current values for the one or more performance measurements via a MnS Producer when a reporting method is via a data file comprises receiving a notifyfileReady notification from the MnS Producer when the data file comprising a required one or more performance measurements is ready as defined in TS 28.550 and TS 28.532.

In an embodiment, the attribute controller is configured to receive the one or more current values for the one or more performance measurements via a MnS Producer when a reporting method is via a data streaming comprises establishing a stream connection using establishStreamingConnection operation as defined in TS 28.550 and TS 28.532. Further, receiving a required measurement stream data from the Mns Producer using reportStreamData operation as defined in TS 28.550.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Advantageous Effects of Invention

According to the disclosure, there is efficiency in Generic Slice Template (GST) enforcement for configured network functions (NFs) by providing Management Data Analytics Service (MDAS).

BRIEF DESCRIPTION OF DRAWINGS

This method is illustrated in the accompanying drawings, throughout which like reference letters indicate corresponding parts in the various figures. The embodiments herein will be better understood from the following description with reference to the drawings, in which:

FIG. 5 illustrates performance measurements collected from network functions used to generate the STAR, according to embodiments as disclosed herein; and FIG. 6 illustrates the STAR used for configuring the network functions, according to embodiments as disclosed herein.

MODE FOR THE INVENTION

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the invention. Likewise, the blocks of the embodiments may be physically combined into more complex blocks without departing from the scope of the invention.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

The principal object of the embodiments herein is to provide a system and method for Management Data Analytics Service (MDAS) assisted Generic Slice Template (GST) configuration.

Another object of the embodiment herein is to allow GST attributes to be configured into Fifth Generation Systems (5GS) network functions for efficient GST enforcement at the run time by the respective or configured network functions (NFs).

Another object of the embodiment herein is to collect one or more performance measurements from one or more network functions.

Another object of the embodiment herein is to generate a slice traffic analysis report based on the collected one or more performance measurements.

Figure 1:
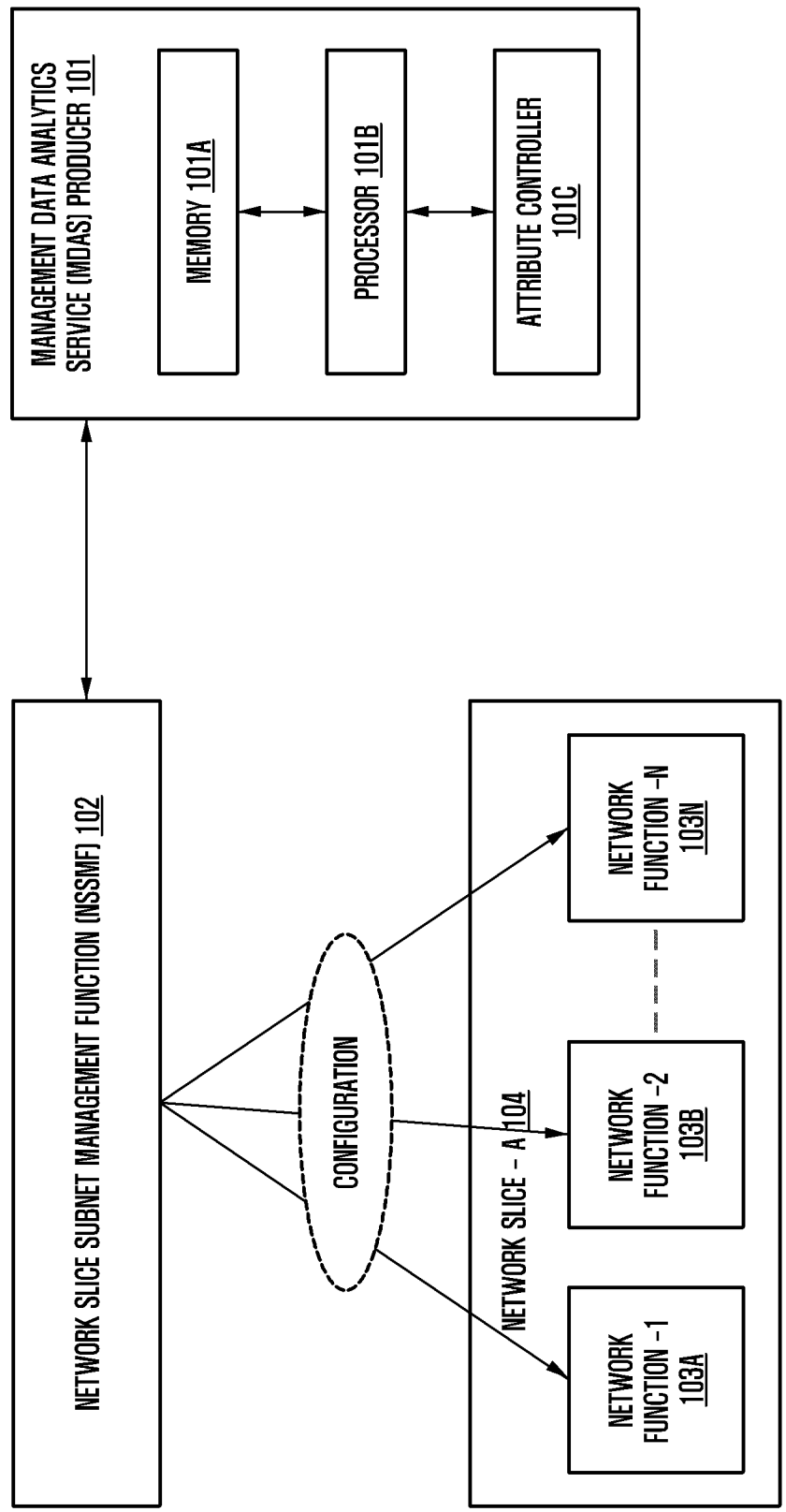
FIG. 1 illustrates a schematic block diagram of a Management Data Analytics Service (MDAS) for configuring Generic Slice Template (GST) in a network function, according to embodiments as disclosed herein.
Figure 2:
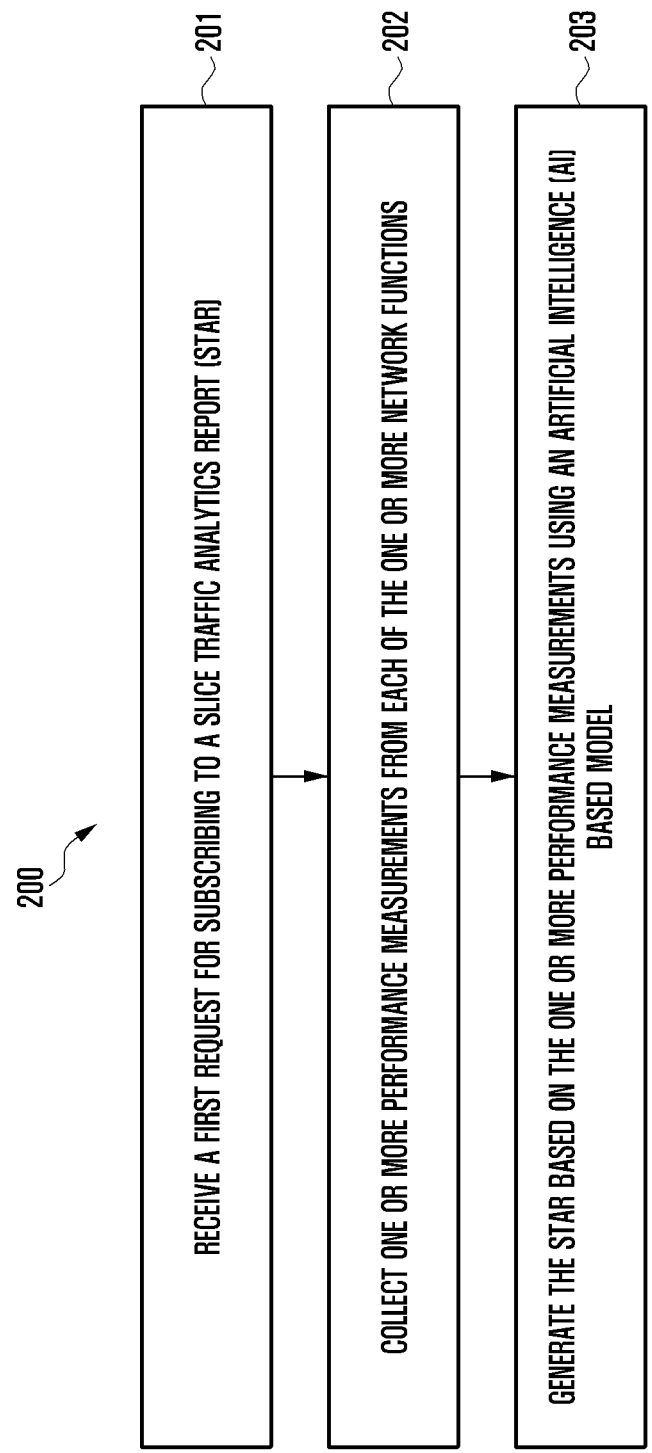
FIG. 2 shows a flowchart illustrating the method steps for configuring one or more configurable attributes in the subnet slice profile, according to embodiments as disclosed herein.
Figure 3:
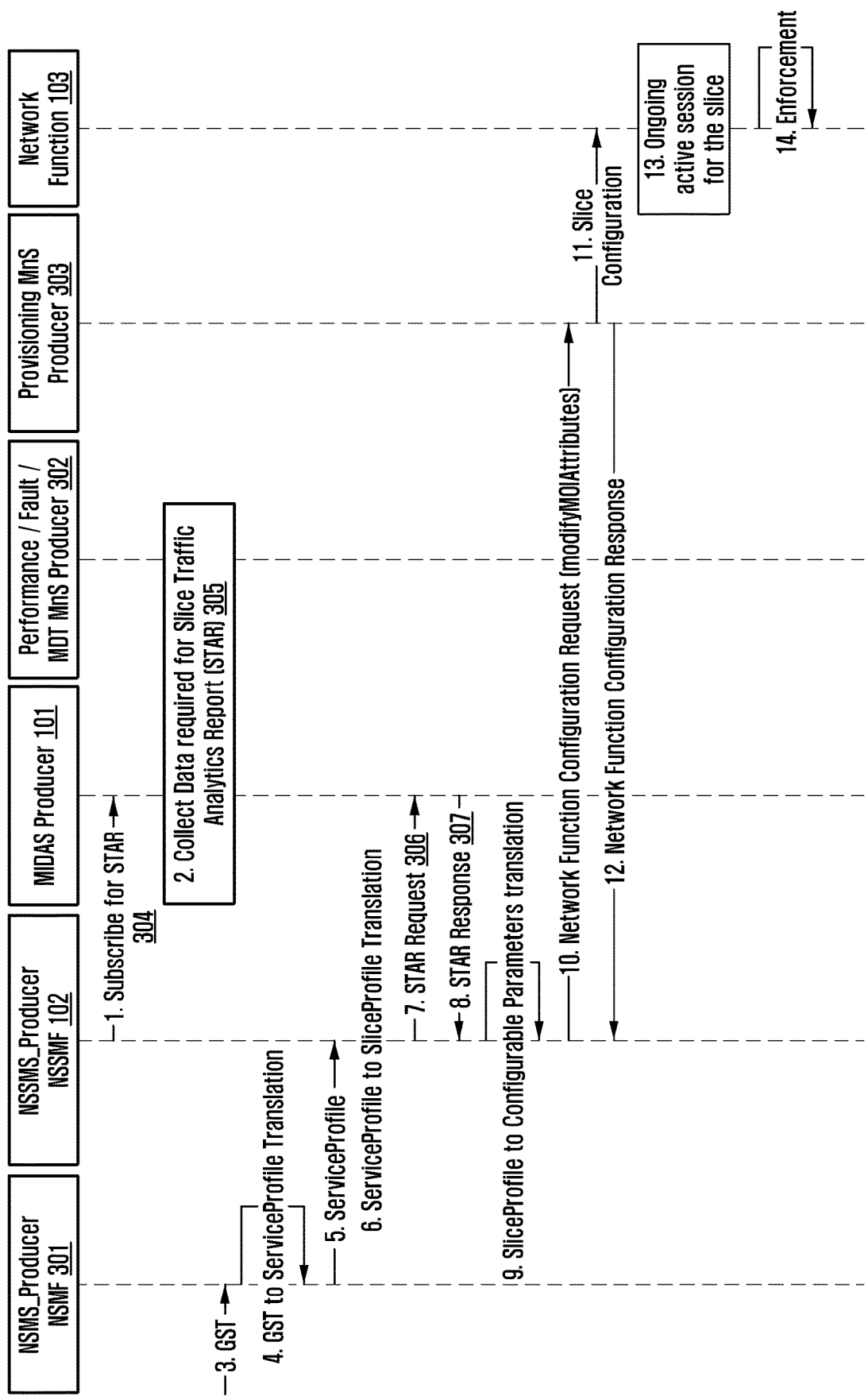
FIG. 3 illustrates a signaling diagram for configuring one or more configurable attributes in the subnet slice profile based on a traffic report provided by a MDAS, according to embodiments as disclosed herein.

Referring to the drawings, and more particularly to FIGS. 1 through 3 there are shown preferred embodiments.

FIG. 1 illustrates a schematic block diagram of a Management Data Analytics Service (MDAS) for configuring Generic Slice Template (GST) in a network function, according to embodiments as disclosed herein.

In one implementation, a Network Slice Subnet Management Function (NSSMF) (102) is used to configure one or more configurable attributes associated with a network slice (i.e., Network Slice A (104)) in corresponding one or more network functions (103A, 103B, 쩔, 103N, collectively denoted as 103). The one or more network functions (103) includes at least one of one or more User Plane Functions (UPFs), one or more Session Management Functions (SMFs), one or more Access and Mobility Management Functions (AMFs), and one or more Next Generation NodeBs (gNBs) and the like. The one or more configurable attributes includes at least one of downlink throughput per network slice, uplink throughput per network slice, maximum supported packet size, a resource type, a priority level, a number of terminals, a number of connections and the like.

In an embodiment, when there is one network function (say 103A), the one or more configurable attributes may be configured up to a maximum available value. In another embodiment, when there are more than one network functions (103), the one or more configurable attributes may be configured by equally allocating a portion of the maximum available value of the one or more configurable attributes. In yet another embodiment, when there are more than one network functions (103), the one or more configurable attributes may be configured based on a Slice Traffic Analytics Report (STAR). The NSSMF (102) requires the STAR for configuring the one or more attributes based on the STAR.

In an embodiment, the NSSMF (102) sends a first request for subscribing to STAR to a Management Data Analytics Service (MDAS) producer (101). The MDAS producer (101) may be a remote server, a standalone server, a distributed server associated with one or more network functions (103) and the like. The MDAS producer (101) includes a memory (101A), a processor (101B), and an attribute controller (101C) communicatively coupled to the memory (101A) and the processor (101B) as shown in FIG. 1.

In an embodiment, the processor (101B) may be a general-purpose processor, such as a Central Processing Unit (CPU), an Application Processor (AP), or the like, a graphics-only processing unit such as a Graphics Processing Unit (GPU), a Visual Processing Unit (VPU) and the like. The processor (101B) may include multiple cores to execute the instructions. Further, the attribute controller (101C) is implemented by processing circuitry such as logic gates, integrated circuits, microprocessors, microcontrollers, memory circuits, passive electronic components, active electronic components, optical components, hardwired circuits, or the like, and may optionally be driven by a firmware. The circuits may, for example, be embodied in one or more semiconductor chips, or on substrate supports such as printed circuit boards and the like.

In an embodiment, the memory (101A) may store the STAR, one or more performance measurements collected from the one or more network functions (103), an Artificial Intelligence (AI) based model for generating the STAR form the one or more performance measurements, a first request, a second request, a response to the second request, a createMeasurementJob request and the like.

In an embodiment, the attribute controller (101C) of the MDAS producer (101) is configured to receive the first request for subscribing to the STAR from the NSSMF (102). The first request indicates to the MDAS producer (101) to initiate collection of the performance measurements from the one or more network functions (103). Further, the attribute controller (101C) of the MDAS producer (101) is configured to collect the one or more performance measurements from each of the one or more network functions (103) after completion of a pre-defined time period. For example, the predefined time period may be 1 millisecond, 1 second, 0.5 second and the like.

In an embodiment, the attribute controller (101C) of the MDAS producer (101) is configured to generate the STAR based on the one or more performance measurements collected from the one or more network functions (103) using the AI based model. For example, the AI based model may include a time series based forecasting model for generating the STAR.

In an embodiment, the attribute controller (101C) of the MDAS producer (101) is configured to receive a second request for the STAR from the NSSMF (102). Further, the attribute controller (101C) of the MDAS producer (101) is configured to send a response comprising the STAR to the NSSMF (102) upon receiving the second request. The NSSMF (102) configures one or more configurable attributes in proportion to the traffic projection received in the response for the network slice (104) in the one or more network functions (103) as shown in FIG. 1.

The MDAS for a Network Slice Subnet Instance (NSSI) provides NSSI related data analytics. The NSSI MDAS may further classify or shape the data into various useful categories and analyze them for different network slice subnet management needs such as scaling, admission control of the constituent NFs and the like. If an NSSI is composed of multiple other NSSIs, the NSSI MDAS acts as a consumer of MDAS of the constituent NSSIs for further analysis such as resource usage prediction, failure prediction for an NSSI, and the like. The MDAS for a network slice instance (NSI) provides NSI related data analytics. The NSI MDAS may further classify or shape the data into various useful categories according to different customer needs, for example, a slice load, constituent NSSI load, communication service loads, and the like. Further, the data is used for analysis such as resource usage prediction, failure prediction for an NSI, and the like.

FIG. 2 shows a flowchart illustrating the method steps for configuring one or more configurable attributes in the subnet slice profile, according to embodiments as disclosed herein.

At the step 201, the method comprises receiving the first request for subscribing to the Slice Traffic Analytics Report (STAR) from the Network Slice Subnet Management Function (NSSMF) (102).

In an embodiment, the NSSMF (102) uses MDAS producer (101) to get the network slice traffic projections including individual traffic projections on each of the one or more network functions (103) present in the network slice (104). The MDAS producer (101) receives the first request (304) for subscribing to the STAR from the NSSMF (102) as shown by the signal 1 in FIG. 3. The first request (304) may include a slice subnet identifier, a reporting frequency and a list of target network functions (103). The slice identifier is used to identify the network slice (104) for which the STAR is solicited. The reporting frequency may include a time interval at which the STAR is solicited. The list of target network functions (103) includes one or more network function (103) instance identifier to be included in the STAR for traffic analysis. In one embodiment, if the list of network functions (103) is empty, then the MDAS producer (101) provides the traffic analysis for all the network functions (103) in the network slice (104).

Figure 4:
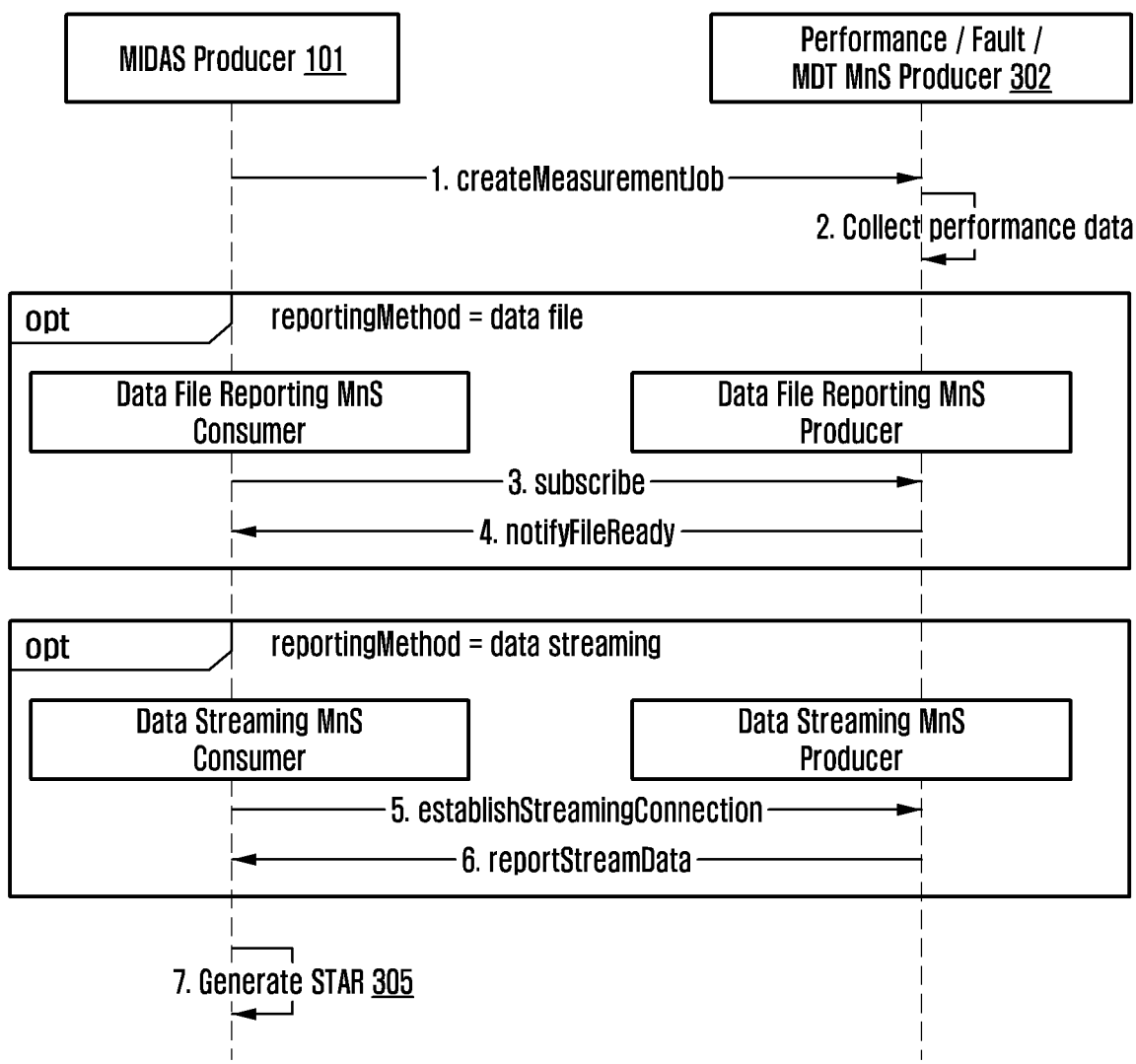
FIG. 4 illustrates a signaling diagram for generation of a Slice Traffic Analysis Report (STAR) and reporting of the STAR, according to embodiments as disclosed herein.

In an embodiment, upon receiving the first request (304), the MDAS producer (101) sends a createMeasurementJob request to a MnS Producer (302) as shown by signal 1 in FIG. 4. The MnS Producer (302) may indicate a producer for Performance Assurance MnS, Fault Supervision MnS and MDT data producer MnS. The createMeasurementJob request comprises at least one of a collection period, the one or more performance measurements to be collected, the list of network functions (103) based on a location and an available virtual resource. The collection period indicates a time interval between two successive collections of the one or more performance measurements. The location indicates the physical location of the one or more network functions (103). The available virtual resource indicates an average available virtual resource (in percentage). If the average virtual resource falls below a pre-defined threshold, then the network function (103) will be subjected to collection of the one or more performance measurements. The average virtual resource may include the average of computation resource, a storage resource and a network resource.

In an embodiment, the createMeasurementJob request may comprise a reporting method as one of a data file, and a data streaming. The reporting method indicates to the MnS producer (302) a technique for providing the one or more performance measurements to the MDAS producer (101).

At the step 202, the method comprises collecting one or more performance measurements from each of the one or more network functions (103) after completion of a pre-defined time period.

The MDAS producer (101) collecting the one or more performance measurements from the Mns Producer (302) is after the pre-defined time period is shown by the signal 2 of FIG. 3. The pre-defined time period may denote the collection period. For example, the collection period may be period may be 5 minutes, 15 minutes, 30 minutes, 1 hour, 12 hours, 24 hours and the like.

In an embodiment, the one or more performance measurements comprises at least one of a current uplink throughput per slice, current downlink throughput per slice, current maximum packet size for a slice, current uplink User Equipment (UE) throughput in a slice, current downlink UE throughput in a slice, current number of Protocol Data Unit (PDU) session per slice, and current number of registered subscriptions per slice and the like.

In an embodiment, the one or more network functions (103) comprises at least one of one or more User Plane Functions (UPFs), one or more Session Management Functions (SMFs), one or more Access and Mobility Management Functions (AMFs), and one or more Next Generation NodeBs (gNBs).

In an embodiment, the Mns Producer (302) receiving one or more current values for the one or more performance measurements from one or more network functions (103) is as shown by signal 2 of FIG. 4.

In an embodiment, the Mns Producer (302) and/or the MDAS producer (101) may collect a current uplink throughput, a current downlink throughput, a current maximum packet size and the like from each UPF instance in the network slice (104). Further, the Mns Producer (302) and/or the MDAS producer (101) may collect a current uplink User Equipment (UE) throughput, a current downlink UE throughput and the like from each gNB instance in the network slice (104).

In an embodiment, the Mns Producer (302) and/or the MDAS producer (101) may collect a current number of PDU sessions from each SMF instance in the network slice (104). Further, the Mns Producer (302) and/or the MDAS producer (101) may collect a current number of subscriptions from each AMF instance in the network slice (104).

In an embodiment, the MDAS producer (101) obtains the one or more current values for the one or more performance measurements from the MnS Producer (302) as the data file as shown by signals 3 and 4 of FIG. 4. Upon receiving the first request (304) from the NSSMF (102), the MDAS producer (101) sends the createMeasurementJob request comprising the reporting method as the data file. Further, the MDAS producer (101) sends a subscribe message to the MnS Producer (302) for one or more performance measurements as shown by signal 3 of FIG. 4. Furthermore, the MDAS producer (101) receives a notifyfileReady notification from the MnS Producer (302) as shown by signal 4 of FIG. 4. The MnS producer (302) send the notifyfileReady notification when the data file comprising a required one or more performance measurements is ready as defined in TS 28.550 and TS 28.532.

In another embodiment, the MDAS producer (101) obtains the one or more current values for the one or more performance measurements from the MnS Producer (302) via the data streaming technique as shown by the signals 5 and 6 of FIG. 4. Upon receiving the first request (304) from the NSSMF (102), the MDAS producer (101) sends the createMeasurementJob request comprising the reporting method as the data streaming technique. The MDAS producer (101) establishes a stream connection with the MnS producer (302) as shown by the signal 5 of FIG. 4 using establishStreamingConnection operation as defined in TS 28.550 and TS 28.532. Further, the MDAS producer (101) receives a required measurement stream data associated with the one or more performance measurements from the Mns Producer (302) as shown by the signal 6 of FIG. 4 using reportStreamData operation as defined in TS 28.550.

At the step 203, the method comprises generating the STAR based on the one or more performance measurements collected from the one or more network functions (103) using the Artificial Intelligence (AI) based model.

In an embodiment, the MDAS producer (101) may generate the STAR (305) as show by the signal 7 of FIG. 4. Further, generating the STAR (305) comprises providing one or more current values of one or more performance measurements and a history (i.e., previously collected) of the one or more performance measurements as an input to the AI based model. The AI based model includes the time-series forecasting technique. For example, the one or more performance measurements provided as the input to the AI based model is as shown in FIG. 5.

In an embodiment, an output from the AI based model is obtained by the MDAS producer (101) and/or the MnS Producer (302). The output indicates one or more projected values for each of the one or more performance measurements as analytics attributes of the STAR (305). Further, the output may include a time stamp at which the output is generated and a projected time duration for which the one or more projected values may be valid.

In one embodiment, the STAR (305) may comprise at least one of the slice subnet identifier, the projection timestamp, the projection duration, and one or more projected values for the one or more analytics attributes for each network function (103) as shown in FIG. 6.

In another embodiment, the STAR (305) may comprise at least one of the current and projected uplink and downlink throughput requirement on each User Plane Function instance (UPF) present in the slice, and a current and projected number of Packet Data Unit (PDU) session for each Session Management Function (SMF) instance present in the slice. Further, the STAR (305) may include a current and projected number of UE or Subscriptions for each AMF instance present in the slice. Furthermore, the STAR (305) may include a current and projected maximum packet size for each UPF instance present in the slice. Thereafter, the STAR (305) may include the current and projected UE uplink and downlink throughput requirement per slice on each gNodeB (gNB) instance present in the slice.

In an embodiment, the GST is provided to NSMF (301) for configuring the network slice (104) as shown by the signal 3 of FIG. 3. The NSMF (301) captures the GST into a service profile as shown by the signal 4 of FIG. 3. Further, the service profile is translated into a slice profile. The NSMF (301) provides the service profile to the NSSMF (102) as shown by the signal 5 of FIG. 3. The NSSMF (102) translates the service profile into the slice profile shown by the signal 6 of FIG. 3.

In an embodiment, the method comprises receiving the second request from the NSSMF (102) for sending the generated STAR (305).

In an embodiment, the second request (306) indicates the request for the STAR (305) sent by the NSSMF (102) to the MDAS producer (101) as shown by the signal 7 of FIG. 3. The second request (306) may include the slice identifier and the list of one or more network functions (103) for individual traffic analysis to be included in the STAR (305).

In an embodiment, the method comprises sending the response comprising the STAR (305) to the NSSMF (102) upon receiving the second request (306), wherein the NSSMF (102) configures one or more configurable attributes in proportion to the traffic projection received in the response.

In an embodiment, the MDAS producer (101) sends the response (307) including the STAR (305) to the NSSMF (102) as shown by the signal 8 of FIG. 3.

In an embodiment, upon receiving the STAR (305), the NSSMF (102) translates the slice profile into one or more configurable attributes and a corresponding configurable parameters (i.e. the value of the configurable attribute) for each of the one or more network functions (103) as shown by the signal 9 of FIG. 3. The NSSMF (102) may determine the configurable parameters based on the slice traffic projections provided in STAR (305). For example, the NSSMF (102) may determine the configurable parameters in proportion to the traffic projections received for each network function (103) in the STAR (305). For example, if the traffic projection for a first network function (103A) is greater than a second network function (103B), then the NSSMF (102) may determine the configuration parameters such that the value of the configuration parameters for the first network function (103A) is greater than the second network function (103B).

Further, the NSSMF (102) sends a network function configuration request as shown by the signal 10 of FIG. 3 to a provisioning MnS producer (303). The NSSMF (102) sends the network function configuration request via modifyMOIAttributes operation as defined in generic Provisioning management service (in TS 28.532). The provisioning MnS producer (303) configures the one or more network functions (103) with corresponding configuration parameter associated with one or more configurable attributes for the network slice (104) as shown by the signal 11 of FIG. 3.

At the time of ongoing active session for the particular network slice (104), the network function (103) will enforce the requirement of the one or more configurable attributes using the configuration parameter received from the NSSMF (102) as shown by the signals 13 and 14 of FIG. 3.

Unlike to conventional methods and systems, the proposed method allows GST attributes to be configured into 5GS network functions based on the projected traffic analysis. Further, enables efficient GST enforcement at the run time by the respective or configured network functions.

The embodiments disclosed herein can be implemented using at least one software program running on at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method performed by a management data analytics service (MDAS) producer in a communication system, the method comprising:
   receiving, from a network function, a request message including management data analytics (MDA) request related information;
   generating an MDA report including analytics for traffic projections of a network entity in a network slice based on the MDA request related information, wherein the analytics is determined based on data associated with performance measurements for the network slice; and
   transmitting, to the network function, the MDA report,
   wherein the MDA report includes information on a projection time for which the traffic projections are provided and information on the traffic projections of the network entity in the network slice, the network entity including at least one of a user plane function (UPF), a base station, a session management function (SMF), or an access and mobility management (AMF).

2. The method of claim 1, wherein the data associated with the performance measurements for the network slice comprises at least one of information on amount of packets collected from the UPF, information on an uplink/downlink User Equipment (UE) throughput collected from the base station, information on a number of protocol data unit (PDU) sessions collected from the SMF, or information on a number of registered subscribers collected from the AMF.

3. The method of claim 1,
   wherein the information on the traffic projections of the network entity in the network slice includes at least one of a projected uplink throughput, a projected downlink throughput, or a projected maximum packet size, based on the network entity being the UPF, and
   wherein the information on the traffic projections of the network entity in the network slice includes at least one of a projected uplink UE throughput, or a projected downlink UE throughput, based on the network entity being the base station.

4. The method of claim 1,
   wherein the MDA request related information includes information on a reporting method, and
   wherein the reporting method indicates one of a data file or a data streaming.

5. The method of claim 4, further comprising:
   in case that the reporting method is the data streaming, setup a streaming connection with the network function based on an establishStreamingConnection operation.

6. The method of claim 1, wherein the network function includes a network slice subnet management function (NSSMF).

7. A management data analytics service (MDAS) producer in a communication system, the MDAS producer comprising:
   a memory; and
   a processor configured to:
      receive, from a network function, a request message including management data analytics (MDA) request related information,
      generate an MDA report including analytics for traffic projections of a network entity in a network slice based on the MDA request related information, wherein the analytics is determined based on data associated with performance measurements for the network slice, and
      transmit, to the network function, the MDA report,
   wherein the MDA report includes information on a projection time for which the traffic projections are provided and information on the traffic projections of the network entity in the network slice, the network entity including at least one of a user plane function (UPF), a base station, a session management function (SMF), or an access and mobility management (AMF).

8. The MDAS producer of claim 7, wherein the data associated with the performance measurements for the network slice comprises at least one of information on amount of packets collected from the UPF, information on an uplink/downlink User Equipment (UE) throughput collected from the base station, information on a number of protocol data unit (PDU) sessions collected from the SMF, or information on a number of registered subscribers collected from the AMF.

9. The MDAS producer of claim 7,
   wherein the information on the traffic projections of the network entity in the network slice includes at least one of a projected uplink throughput, a projected downlink throughput, or a projected maximum packet size, based on the network entity being the UPF, and
   wherein the information on the traffic projections of the network entity in the network slice includes at least one of a projected uplink UE throughput, or a projected downlink UE throughput, based on the network entity being the base station.

10. The MDAS producer of claim 7,
    wherein the MDA request related information includes information on a reporting method,
    wherein the reporting method indicates one of a data file or a data streaming, and
    wherein, in case that the reporting method is the data streaming, the processor is further configured to setup a streaming connection with the network function based on an establishStreamingConnection operation.

11. The MDAS producer of claim 7, wherein the network function includes a network slice subnet management function (NSSMF).

* * * * *